(12) United States Patent
Abu-Samaha

(10) Patent No.: US 6,938,087 B1
(45) Date of Patent: Aug. 30, 2005

(54) DISTRIBUTED UNIVERSAL COMMUNICATION MODULE FOR FACILITATING DELIVERY OF NETWORK SERVICES TO ONE OR MORE DEVICES COMMUNICATING OVER MULTIPLE TRANSPORT FACILITIES

(75) Inventor: Mamoun Abu-Samaha, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 765 days.

(21) Appl. No.: 09/660,464

(22) Filed: Sep. 12, 2000

(51) Int. Cl.[7] .............................................. G06F 15/16
(52) U.S. Cl. ...................... 709/227; 709/230; 370/465; 370/469
(58) Field of Search .............................. 709/227, 230; 370/465, 469, 535; 379/10.03, 201.03; 455/410

(56) References Cited

U.S. PATENT DOCUMENTS

| | | | |
|---|---|---|---|
| 5,680,551 A | 10/1997 | Martino, II | |
| 5,704,029 A | 12/1997 | Wright, Jr. | |
| 5,790,789 A | 8/1998 | Suarez | |
| 5,857,201 A | 1/1999 | Wright, Jr. et al. | |
| 5,864,827 A | 1/1999 | Wilson | |
| 5,928,335 A | 7/1999 | Morita | |
| 5,940,598 A * | 8/1999 | Strauss et al. | 709/249 |
| 5,942,986 A | 8/1999 | Shabot et al. | |
| 5,961,586 A | 10/1999 | Pedersen | |
| 5,974,449 A | 10/1999 | Chang et al. | |
| 5,983,265 A | 11/1999 | Martino, II | |
| 5,999,941 A | 12/1999 | Andersen | |
| 6,016,496 A | 1/2000 | Roberson | |
| 6,018,710 A | 1/2000 | Wynblatt et al. | |
| 6,041,365 A | 3/2000 | Kleinerman | |
| 6,055,236 A * | 4/2000 | Nessett et al. | 370/389 |
| 6,055,541 A | 4/2000 | Solecki et al. | |
| 6,085,222 A | 7/2000 | Fujino et al. | |

(Continued)

FOREIGN PATENT DOCUMENTS

| | | |
|---|---|---|
| WO | WO97/14244 | 4/1997 |
| WO | WO00/27135 | 5/2000 |
| WO | WO0039666 | 7/2000 |

OTHER PUBLICATIONS

Zimba, "mProductivity: Introduction, Technology, Architecture," ((c) 2000; www.zimba.com, visited Sep. 9, 2000).

*Primary Examiner*—John Follansbee
*Assistant Examiner*—Jinsong Hu

(57) ABSTRACT

A system for providing remote electronic services includes an agent, a communication module, and an access file. The agent receives request for-service-calls in any format selected from a voice format, an internet format, an e-mail format, and a wireless format, and transmits a request-for-service call to the access file in accordance with a hypertext transfer protocol for each of the received request-for-service calls. The access file invokes at least one service module in response to a given request-for-service call received from the agent. The at least one service module performs a prescribed function to produce a service deliverable requested in the given request-for-service call, accesses an instance of the communication module, and passes the one or more control parameters and the service deliverable to the communication module. The communication module transmits the service deliverable received from the at least one service module to the destination network node specified in the given request-for-service call in any format selected from a voice format, an internet format, an e-mail format, and a wireless format.

27 Claims, 5 Drawing Sheets

U.S. PATENT DOCUMENTS

| | | | |
|---|---|---|---|
| 6,138,148 A | * 10/2000 | Lipkin | 709/206 |
| 6,167,449 A | * 12/2000 | Arnold et al. | 709/227 |
| 6,477,576 B2 | * 11/2002 | Angwin et al. | 709/226 |
| 6,560,633 B1 | * 5/2003 | Roberts et al. | 709/202 |
| 6,594,700 B1 | * 7/2003 | Graham et al. | 709/230 |
| 6,621,895 B1 | * 9/2003 | Giese | 379/201.03 |

* cited by examiner

DISTRIBUTED UNIVERSAL COMMUNICATION MODULE FOR FACILITATING DELIVERY OF NETWORK SERVICES TO ONE OR MORE DEVICES COMMUNICATING OVER MULTIPLE TRANSPORT FACILITIES

TECHNICAL FIELD

This invention relates to a universal or generic communication module for facilitating delivery of network services to one or more devices communicating over multiple transport facilities.

BACKGROUND

Various communication networks exist for enabling distributed devices to communicate and pass information between one another. Networks usually are classified based upon three properties: topology, protocol, and architecture. The topology of a network specifies the geometric arrangement of the network. Common topologies are a bus, ring, and star. The protocol specifies a common set of rules and signals the device on the network use to communicate. The architecture of a network refers to the network design. There are two major types of network architecture: peer-to-peer and client-server. In a peer-to-peer networking configuration, there is no central server, and devices simply connect with each other in a workgroup to share files, printers, and Internet access. In a client-server architecture, there usually is a central server, with which all of the devices register. The central server usually provides a variety of services, including centrally routed Internet access, e-mail, file sharing, and printer access, as well as ensuring security across the network. A network architecture also may be characterized as being open (i.e., the specifications are available to the public) or closed (i.e., the specifications are proprietary).

Unfortunately, different network platforms and transport facilities have developed independently of one another, each with its own idiosyncratic computing platform (hardware and software) and communications protocol. As a result, it has become increasingly difficult to implement communications programs that enable different types of devices to communicate over different networks.

Middleware products have been developed to address the need for interfaces between different computing platforms. Middleware is positioned between different components and resources of a computer network that communicate with each other. Middleware typically includes software products designed to provide various infrastructure and interfacing services between the different components and resources. Most middleware products support a tightly coupled distributed system model that requires all parts of a distributed system to be developed using a pre-defined application program interface (API). As result, any changes to any module require modifications to other modules, and changes to the API may require extensive changes to all modules. Many middleware product models have been developed (e.g., CORBA (Common Object Request Broker Architecture) from OMG, RMI (Remote Method Invocation) from Sun Microsystems, Inc. and DCOM (Distributed Component Object Model) from Microsoft Corporation). Typically, each such model is incompatible with other models, and applications developed under any such model will be unable to communicate with any application developed under a different model. Systems based upon such models typically include modules that rely upon middleware to provide a variety of services (e.g., connectivity, message routing, and data encryption). Applications developed under such a system are integrated tightly with the middleware and, therefore, are not readily integrated with the services of other systems.

SUMMARY

The invention provides a scheme by which a computer may communicate with a variety of different systems (e.g., e-mail, voice mail, cellular telephone, pager, facsimile device, computer, motor, and home appliance) notwithstanding the communications protocol employed by different systems. In particular, the invention features a universal communication module that establishes an open, transport-independent communications protocol that may be created and invoked to facilitate communications between any two devices interconnected over a global communication network that includes wireline (e.g., dial-up, dedicated line and local and wide area networks) and wireless (e.g., radio frequency and cellular) networks.

In one aspect, the invention features a system for providing remote electronic services to a network node, comprising an origination agent, a communication module, and a service module. The origination agent resides at the origination network node. The origination agent is configured to transmit a request-for-service call incorporating one or more control parameters, including a destination node address. The communication module encapsulates processes for communicating with the destination network node over multiple transport facilities. The service module resides on a server computer remote from the origination network node. The service module is configured to perform a prescribed function to produce a service deliverable in accordance with the request-for-service call and to access an instance of the communication module and pass the one or more control parameters and the service deliverable to the communication module for delivery to the destination network node.

Embodiments of the invention may include one or more of the following features.

The origination agent preferably is configured to transmit the request-for-service call in accordance with a hypertext transfer protocol (http). The origination agent may be configured to transmit one or more of the following control parameters with the request-for-service call: an origination address, a security profile identifier, a service identifier, an output type identifier, a destination device address, and data. A destination agent preferably resides at the destination network node. The destination agent preferably is configured to communicate with the communication module.

An access file preferably resides on the remote computer. The access file is configured to invoke the service module in response to the request-for-service call. The access file may be an active server page. The access file preferably is configured to obtain one or more control parameters from the request-for-service call and to pass the control parameters to the service module. The service module may be configured to pass the control parameters to the communication module as a function call to a COM (Collaboration Object Model) interface.

The communication module preferably is configured to communicate with the destination network node over any one of the following transport facilities: a voice network, the Internet, an electronic mail (e-mail) network, and a wireless network. The communication module preferably is configured to establish a communication link with the destination network node based upon the destination node address. The communication module preferably is configured to format the service deliverable produced by the service module in accordance with an identified node type classification for the destination network node. The communication module may be configured to identify a node type classification for the destination network node based upon a communication received from the destination network node. The communication module preferably is configured to transmit the formatted service deliverable to the destination network node. The communication module may be configured to transmit to the origination network node a request for one or more control parameters.

A second service module preferably resides on a second server computer remote from the origination network node. The second service module is configured to access a second instance of the communication module. The first and second service modules may be configured to cooperatively perform respective functions to produce the service deliverable and to communicate through the respective instances of the communication module. The instances of the communication module preferably are configured to communicate with each other in accordance with a hypertext transfer protocol (http). The first and second service modules may be registered in a common configuration database.

The service module may be configured to produce an available services list to be presented by the communication object to the origination network node. The communication module preferably is configured to format the available services list in accordance with a received device type classification for the origination network node.

Among the advantages of the invention are the following.

The invention enables messages (e.g., voice and e-mail), data elements and other information to be pushed or pulled from any electronic system that is connected to a network—no matter where it is located—to any other electronic system that is connected to a network. The sending signal and the receiving signal may exist on either side of the inventive universal communication object so that information may be pushed to or sent from a source application. The invention also allows a single shared application to render output appropriate for multiple device types.

Other features and advantages of the invention will become apparent from the following description, including the drawings and the claims.

DETAILED DESCRIPTION

Figure 1:
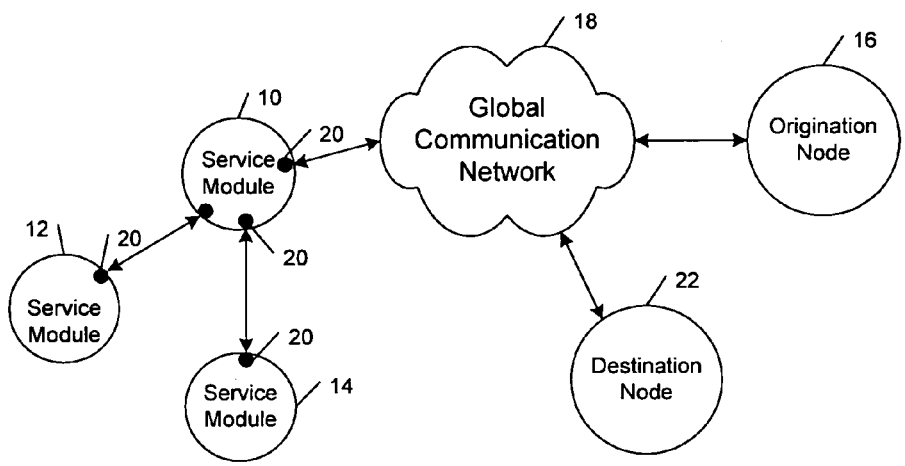
FIG. 1 is a diagrammatic view of a plurality of remote service modules performing respective functions cooperatively to provide one or more electronic services to an origination network node connected to a global communication network.

Referring to FIG. 1, in one embodiment, one or more remote service modules 10, 12, 14 may perform respective functions cooperatively to provide one or more electronic services to an origination network node 16 that is connected to service modules 10–14 by a global communication network 18. Each service module 10–14 accesses a respective instance of a universal or generic communication module 20, which encapsulates one or more processes for communicating with a variety of different devices over multiple transport facilities. Universal communication module 20 is accessible simultaneously at multiple nodes of a distributed computing environment to manage the communication requirements of each service module 10–14. In particular, universal communication module 20 manages service communication in a way that shields service module developers from the idiosyncrasies of different networks, protocols, devices, standards, routing, recovery and other transport difficulties or differences. As a result, a device operating at origination network node 16 may request a remote electronic service, and service components 10–14 may cooperate to produce a service deliverable that may be transmitted back to the origination node 16 or transmitted to another destination node 22 in an appropriate format.

Figure 2:
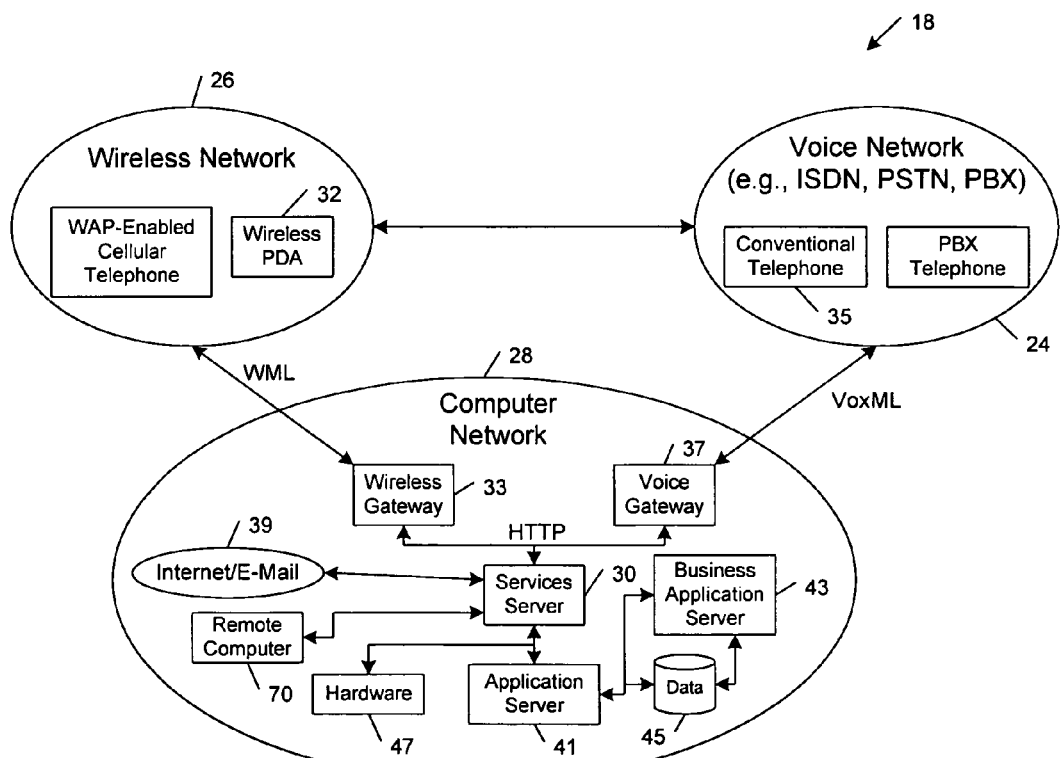
FIG. 2 is a diagrammatic view of a global communication network including a voice network, a computer network and a wireless network.

As shown in FIG. 2, global communication network 18 may include a number of different computing platforms and transport facilities, including a voice network 24, a wireless network 26 and a computer network 28. The remote electronic services mentioned above may be provided through a server computer 30 of computer network 28. Request-for-service calls may be made and requested service deliverables (electronic contents) may be presented in a number of different media formats, including a generic format (e.g., text) or a specific format, such as voice, Internet, e-mail and wireless formats. For example, voice contents may be presented as Voice extensible Markup Language (VoxML) documents; Internet contents may be presented as Hypertext Markup Language (HTML) documents; e-mail contents may be presented as Microsoft Exchange or open-mail documents; and wireless contents may be presented as Wireless Markup Language (WML) documents. As explained in detail below, the universal communication module enables messages and service deliverables to be transmitted between service components and other network nodes in accordance with a generic communications protocol (e.g., the Hypertext Transfer Protocol (HTTP)).

Devices connected to global communication network 18 may access a wide variety of electronic services through server computer 30. For example, in one illustrative implementation, a wireless device 32 (e.g., a wireless personal digital assistant (PDA)) may connect to server computer 30 over wireless network 26. Communications from wireless device 32 are in accordance with the Wireless Application Protocol (WAP). A wireless gateway 33 converts the WAP communications into HTTP messages that may be processed by server computer 30. In another illustrative implementation, a voice device 35 (e.g., a conventional telephone or a PBX telephone) may connect to server computer 30 over voice network 24. Communications from voice device 35 may be in the form of conventional analog or digital voice signals, or they may be formatted as VoxML messages. A voice gateway 37 may use speech-to-text technology to convert the voice signals into HTTP messages; VoxML messages may be converted to HTTP messages based upon an extensible style language (XSL) style specification. Voice gateway 37 also is configured to receive from server 30 real time voice messages that may be passed directly to voice device 35, or formatted messages (e.g., VoxML, XML, WML, e-mail) that must be converted to a real time voice format (e.g., using text-to-speech technology) before the messages may be passed to voice device 35. In a third illustrative implementation, an e-mail (e.g., an electronic mail messaging system) or Internet-based device 39 (e.g., a web browser) may connect to server computer 30 directly over computer network 28. Communications between device 39 and server computer 30 may be in accordance with a standard e-mail protocol (e.g., MAPI, X.400 or HTTP).

When a device initially contacts server computer 30, server computer 30 may present to the device an appropriately formatted message containing a list of available electronic services, such as voice services, Internet services, e-mail services and wireless services. The device may transmit a request-for-service call and server computer 30 may process the call to identify the requested service and the network address where the resulting service deliverable should be transmitted. If additional information is needed to deliver the service, server computer 30 may transmit a message prompting the user of the device to provide the needed information. In response to the request-for-service call, server computer 30 initiates one or more service modules 10–14 to produce the requested service deliverable. Through respective instances of universal communication module 20, one or more service modules 10–14 cooperatively perform respective tasks to produce the requested service deliverable. Universal communication module 20 also enables service modules 10–14 to access legacy applications 41, 43 and databases 45, as well as control hardware devices 47 (a facsimile machine for faxing documents, or a telephone switch for call redirection) that are connected to global network 18. A source service module passes the service deliverable and one or more control parameters obtained from the request-for-service call to an instance of universal communication module 20. Based upon the control parameters, universal communication module 20 communicates with the device operating at destination network node 22 to determine its type classification. Universal communication module 20 formats the service deliverable in accordance with the type classification of the destination device, and transmits the formatted service deliverable to the destination device. After delivery of the service deliverable, universal communication module 20 may call back to the source service, establish a link with another service or end processing.

As used herein, the term "service deliverable" refers broadly to the results of push services processing, pull services processing, or transaction services processing. Push services send service deliverables to a destination node without receiving a request from the destination node. Pull services send service deliverables to the origination node upon request. Transaction services enable the origination node to control one or more computer processes or applications (e.g., enable an origination device to write data to a database).

Figure 3:
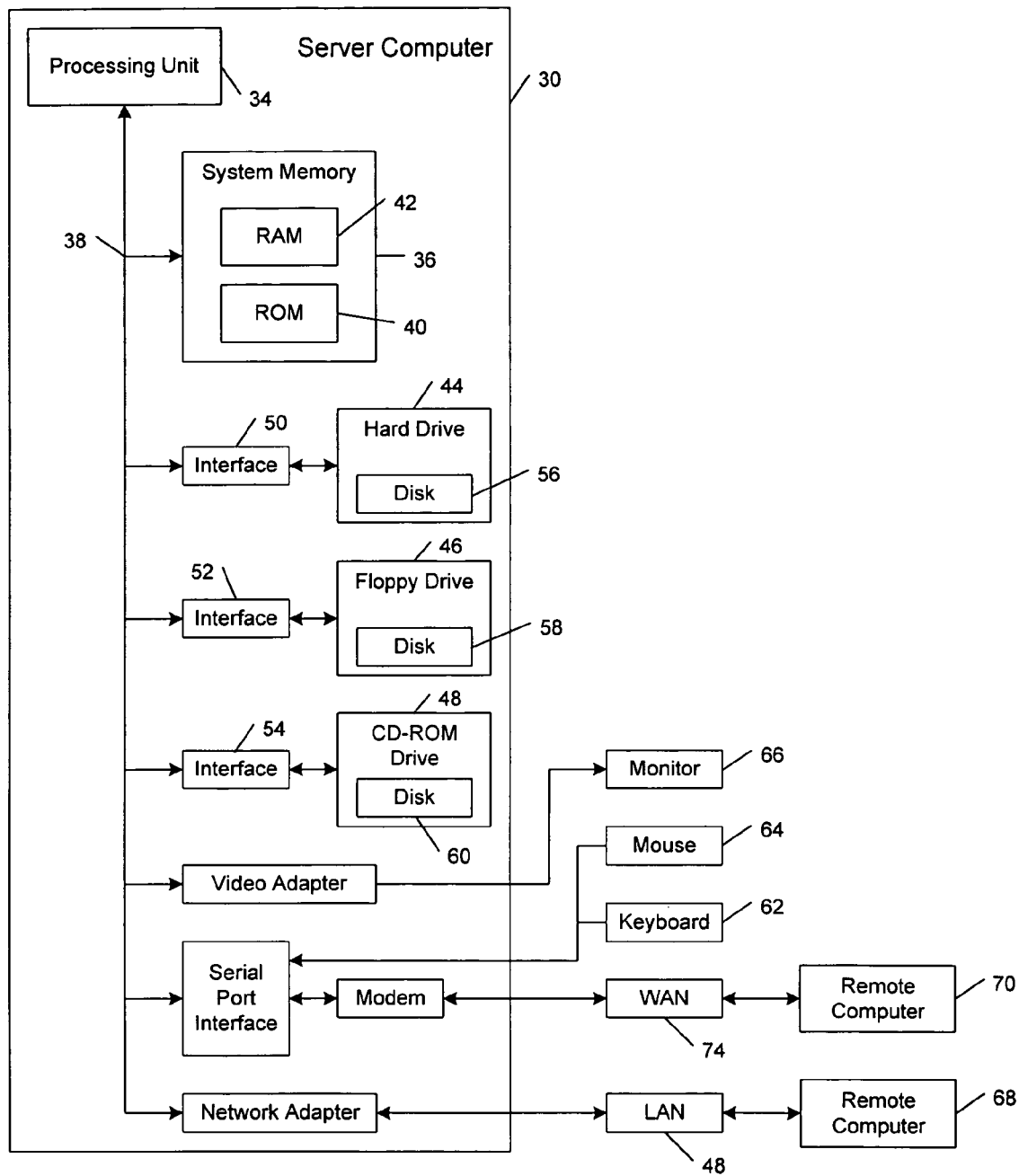
FIG. 3 is a block diagram of a computer network that includes a server computer and two remote computers.

Referring to FIG. 3, in one embodiment, server computer 30 includes a processing unit 34, a system memory 36, and a system bus 38 that couples processing unit 34 to the various components of server computer 30. Processing unit 34 may include one or more processors, each of which may be in the form of any one of various commercially available processors. System memory 36 includes a read only memory (ROM) 40 that stores a basic input/output system (BIOS) containing start-up routines for server computer 30, and a random access memory (RAM) 42. System bus 38 may be a memory bus, a peripheral bus or a local bus, and may be compatible with any of a variety of bus protocols, including PCI, VESA, Microchannel, ISA, and EISA. Server computer 30 also includes a hard drive 44, a floppy drive 46, and a CD ROM drive 48 that are connected to system bus 38 by respective interfaces 50, 52, 54. Hard drive 44, floppy drive 46, and CD ROM drive 48 contain respective computer-readable media disks 56, 58, 60 that provide non-volatile or persistent storage for data, data structures and computer-executable instructions. Other computer-readable storage devices (e.g., magnetic tape drives, flash memory devices, and digital video disks) also may be used with server computer 30. A user may interact (e.g., enter commands or data) with server computer 30 using a keyboard 62 and a mouse 64. Other input devices (e.g., a microphone, joystick, or touch pad) also may be provided. Information may be displayed to the user on a monitor 66. Server computer 30 also may include peripheral output devices, such as speakers and a printer. Server computer 30 may be connected to remote computers 68, 70, which may be workstations, server computers, routers, peer devices or other common network nodes. Remote computer 68 may be connected to server computer 30 over a local area network (LAN) 72, and remote computer 70 may be networked over a wide area network (WAN) 74 (e.g., the Internet).

Figure 4:
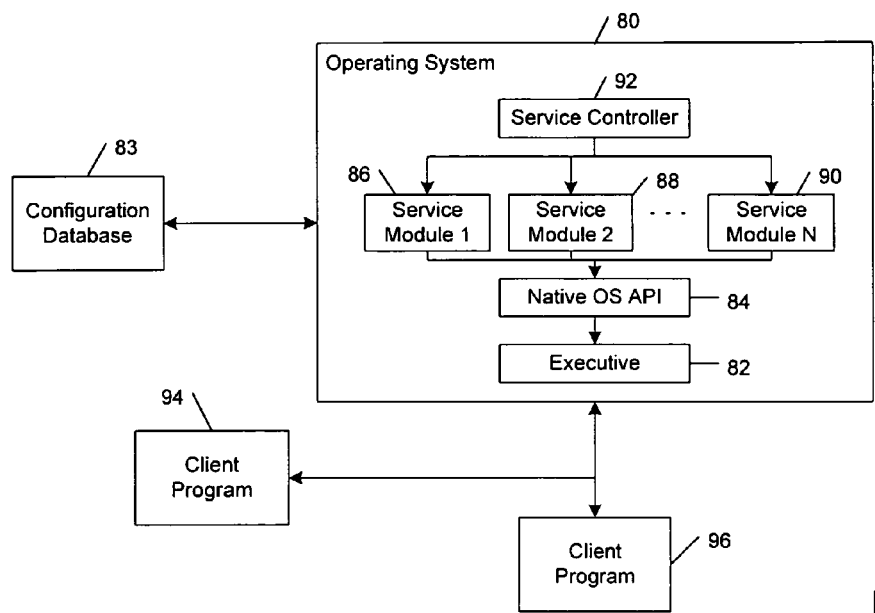
FIG. 4 is a block diagram of a service module execution environment provided by the server computer of FIG. 3.

Referring to FIG. 4, a number of program modules may be stored on storage drives 44–48 and in RAM 40, including an operating system 80 (e.g., the Windows NT Server operating system available from Microsoft Corporation of Redmond, Wash. U.S.A.), one or more application programs, and program data. Operating system 80 includes an executive 82 that provides the base operating system services (e.g., memory management, process and thread management, security, input/output, and inter-process communication) for creating a run-time execution environment on server computer 30. A configuration database (or registry) 83 contains the following information: parameters needed to boot and configure the system; system-wide software settings that control the operation of operating system 80; a security database; and per-user profile settings. A native operating system (OS) application programming interface (API) 84 exposes the base operating system services of executive 82 to user applications and to one or more service modules (or simply "services") 86, 88, 90. As used herein, the term "service" (or "service module") refers to a component of an operating system that provides a set of one or more functions. Service modules 86–90 are user-mode processes that may be configured to start automatically at system boot time without requiring an interactive logon; they also may be controlled dynamically during run-time. Service modules 86–90 call certain base operating system services (or functions) to interact with a service controller 92; such functions may include registering a successful startup, responding to status requests, and pausing or shutting down the service. Service controller 92 starts, manages and directs operations within service modules 86–90. Service modules 86–90, on the other hand, create the environment in which one or more processes may operate and control the start-up, maintenance and termination of such processes. Typically, the run-time execution environment is installed on server computer 30, and one or more client application programs 94, 96 operating on remote computers 68, 70 may access the functionality provided by service modules 86–90 over their respective network connections. In an alternative embodiment, the run-time execution environment may be installed on a single computer that hosts both service modules 86–90 and client programs 94, 96.

Before a service module 86–90 may operate in the run-time execution environment, it must be installed on server computer 30. A service module typically is installed by storing the service module in a data storage area that is accessible by server computer 30 (e.g., on disk 56 of in hard drive 44), and registering the attributes of the service module in configuration database 83. The universal communication module also is registered in configuration database 83. The remote service modules may be configured as a dynamic link library (DLL). A DLL is a computer code module that contains functions that may be linked with application code. A DLL may be loaded and linked to an application at run time, and may be unloaded when its functionality is no longer needed.

Figure 5:
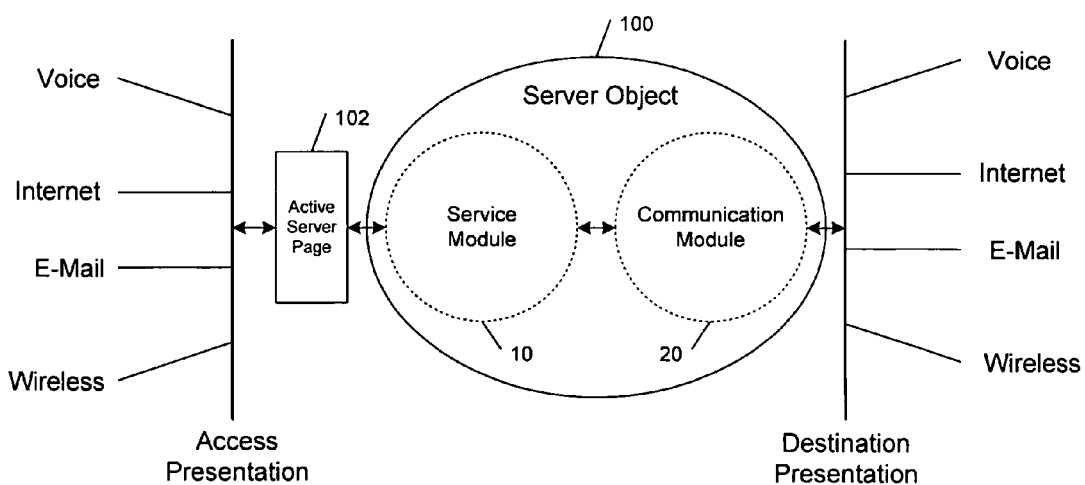
FIG. 5 is a diagrammatic view of a server object accessing an instance of a universal communication module to deliver a service to one or more distributed devices communicating over multiple transport facilities, including voice, Internet, e-mail and wireless transport facilities.
Figure 6A:
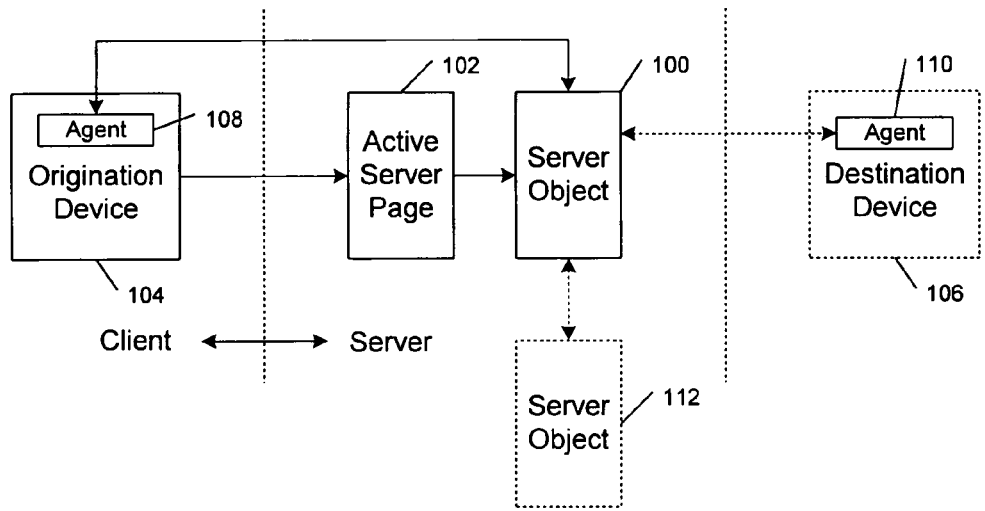
FIG. 6A is a block diagram of a distributed communication system including the server object of FIG. 5.
Figure 6B:
FIG. 6B is a flow diagram of the information passed between the components of the communication system of FIG. 6A.

Referring to FIGS. 5, 6A and 6B, in one embodiment, a service may be implemented as a server object 100 that is formed from service module 10 and an instance of universal communication module 20. An access file 102 (e.g., an active server page implemented in any of the script languages supported by the Microsoft server page facility), which may be stored on any one of storage drives 44–48, handles request-for-services calls and initiates the requested service. Access file 102 includes a script (e.g., a Visual Basic® script or a CDO (Collaboration Data Object) script) that initiates service module 10, and service module 10 accesses (or embeds) an instance of universal communication module 20 that is initialized in accordance with one or more control parameters obtained from a received request-for-service call. As explained in detail below, communication module 20 manages communications for service module 10. In particular, communication module 20 manages communications with both an origination device 104 operating at origination node 16 and a destination device 106 operating at destination node 22. Access to and service deliverables provided by service module 10 may be presented by universal communication module 20 in multiple media formats, including voice, Internet, e-mail and wireless formats.

As shown in FIGS. 6A and 6B, in operation, an origination device 104 operating at origination node 16 includes an origination agent 108 that is configured to transmit a request-for-service call that includes a URL (uniform resource locator) with the IP address for an access file 102 corresponding to the requested service. The request-for-service call is presented originally in HTTP format or it is converted to HTTP format. The HTTP request-for-service call has the following format: an initial line, zero or more header lines, a blank line, and an optional message body. The initial line may specify a request or a response. A request line has three parts, separated by spaces: a method name, the local path of the requested resource, and the version of HTTP being used. The initial response line (i.e., the status line) also has three parts separated by spaces: the HTTP version, a response status code that specifies the result of the request, and a description of the status code. Header lines provide information about the request or response, or about the object sent in the message body. The message body may contain binary data, file contents and query data (collectively referred to herein as "data").

In one embodiment, the HTTP request-for-service call may contain one or more of the following control parameters: an origination address, a security profile identifier, a service identifier, an output_type identifier, a destination address, and data. In this embodiment, a typical HTTP request-for-service would have the following format:
  <initial line>
  origination_address: value 1
  security_profile: value 2
  service: value 3
  output_type: value 4
  destination_address: value 5
  <message body: data>

The origination address and the destination address correspond to the specific network addresses (e.g., telephone number, radio modem ID, IP address, or x.25 address) by which an incoming message was received and by which an outgoing message is to be delivered, respectively.

Upon receipt of the request-for-service call, service controller 92, which monitors incoming service requests, instantiates in RAM 42 an access file 102 corresponding to the requested resource identified by a URL in the initial line of the request-for-service call. Service controller 92 causes server computer 30 to execute the script contained within access file 102. Execution of the script extracts the control parameters from the request-for-service call and initiates service module 10. The control parameters are passed to the service modules in text format. Service module 10 executes its service logic to produce a service deliverable, and passes the service deliverable and the control parameters obtained from the request-for-service call to an instance of universal communication module 20 as a functional call to a COM (Component Object Model) interface.

Service modules may function alone or in combination in accordance with a number of different services models to provide a wide range of electronic services over multiple transport facilities. In a master-slave services model, a master service may access an instance of universal communication module 20 to launch one or more slave services and send each slave a task to accomplish. The master service may wait until the slave services complete their processing tasks. In a fault tolerant services model, an original service may replicate its tasks to other services through universal communication module 20 to maintain one or more redundant services that synchronize with the original service until the original service fails. In a load balancing services model, an original service may distribute its tasks through universal communication module 20 throughout the network. The original service may monitor and process the results produced by the other services. In a cooperative processing model, one or more services may communicate through respective instances of universal communication module 20 and collaborate to =produce a particular service deliverable.

A service module may be written in any programming language and may be configured to provide any service so long as it communicates with universal communication object 20 in accordance with a prescribed application program interface (API). In particular, each service module must pass certain parameters obtained from the request-for-service call and the service deliverable in an HTML format or a text format. In addition, a service module should filter or otherwise modify the content of the resulting service deliverable to support delivery to the specified destination device. For example, if the destination device is a wireless device, such as a WAP-enabled cellular telephone or a PDA that has limited viewing resources or limited bandwidth, or both, the service deliverable should be filtered to reduce the amount of information transmitted to the destination device. For example, images or other contents that cannot be adequately viewed or received by destination device 106 might be removed before the service deliverable is transmitted to destination device 106.

Based upon the control parameters, the universal communication module may communicate with an agent 110 operating within destination device 106 to determine the type classification of destination device 106. Alternatively, origination device 104 may specify the destination device format in the request-for-service call. Universal communication module 20 formats the service deliverable in accordance with the type classification of destination device 106, and transmits the formatted service deliverable to destination device 106. Universal communication module 20 may format the service deliverable into a generic format (e.g., text) or a particular (e.g., style sheet or template) document format. Universal communication module 20 may format the service deliverable into an appropriate media format based upon an extensible style language (XSL) style specification, which specifies a way in which style may be separated from content in extensible markup language (XML) documents. For example, universal communication module 20 may pass the service deliverable received from service module 10 to destination device 106 in any of the following markup language formats: VoxML for voice-based destination devices; HTML for Internet-based destination devices; and WML for wireless-based destination devices. Universal communication module also is configured to convert the service deliverable into any of the following additional formats: a voice-mail file or phone tree signals activating a text-to-voice or a voice-to-text service for voice-based destination devices; and e-mail, open-mail, SMS (systems management server), SMTP (simple mail transfer protocol) or Microsoft Exchange for e-mail-based destination devices.

After delivery of the service deliverable, universal communication module 20 may call back to the source service module 10, establish a link with another server object 112 or end processing.

Transport Protocols

Universal communication module 20 enables a wide variety of services to be provided to one or more devices communicating over a number of different transport facilities, including voice, Internet, e-mail and wireless transport facilities. The following sections described exemplary protocols for implementing services over voice and e-mail transport facilities.

Voice Application Protocols

Figure 7:
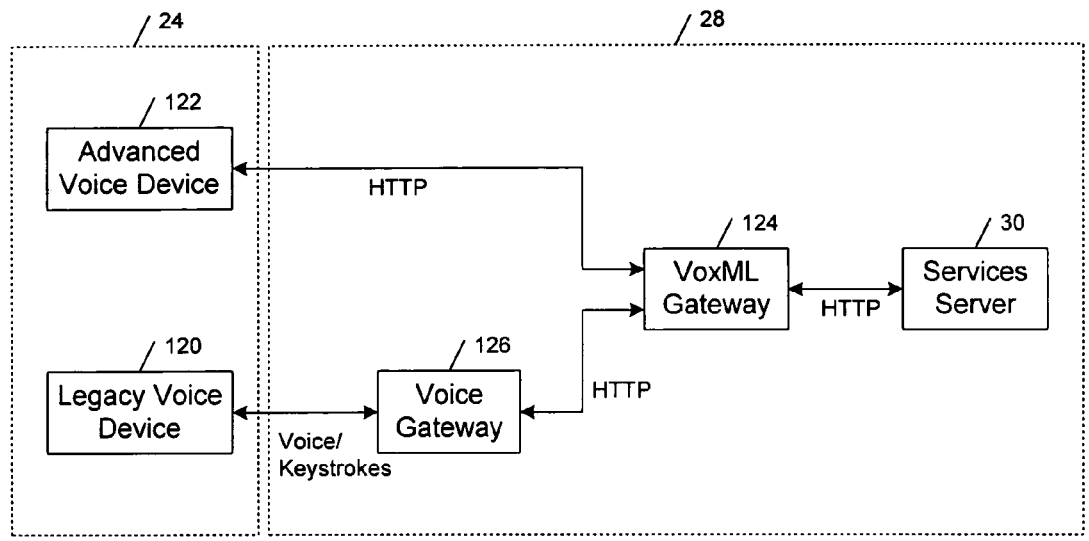
FIG. 7 is a block diagram of an advanced voice device and a legacy voice device communicating with a services server over a voice network.

Referring to FIG. 7, a legacy voice device 120 (e.g., a conventional analog or digital telephone) and an advanced voice device 122 (e.g., a VoxML-enabled telephone with text-to-speech and speech-to-text functionality) may access one or more services provided by services server 30 over a network connection to a VoxML gateway 124.

For example, legacy voice device 120 may access the services of services server 30 as follows. After connection of legacy voice device 120 to VoxML gateway 124, VoxML gateway 124 transmits a VoxML request form to a voice gateway 126. The VoxML request form may present one or more service options for selection by legacy voice device 120. The VoxML request form is sent to voice gateway 126 using the HTTP transfer protocol. Voice gateway 126 translates the VoxML request form into analog or digital voice signals using text-to-speech technology. The translated VoxML request form may be presented to legacy voice device 120 as a voice-based option tree. Legacy voice device 120 may respond to the translated VoxML request form with voice signals or keystroke signals, or both. Voice gateway 126 translates the signals received from legacy voice device 120 into a VoxML message using speech-to-text technology and an XSL style specification. The VoxML message is sent to VoxML gateway 124 using the HTTP transfer protocol. The receipt of the HTTP message triggers an access file (e.g., an active server page) on VoxML gateway 124. The access file executes a script (e.g., a JAVA script or a Visual Basic® script) that handles the completed VoxML request form and creates a server object that transmits an HTTP request-for-service call to services server 30, which processes the request-for-service call as described above.

Advanced voice device 122 may access the services of services server 30 in a similar way, except advanced voice device 122 may bypass voice gateway 126 and communicate directly with VoxML gateway 124 because the functionality provided by voice gateway 126 is incorporated into advanced voice device 122.

In another embodiment, the functionality of voice gateway 126 and VoxML gateway 124 may be incorporated into a single voice gateway server computer.

E-Mail Application Protocols

Figure 8:
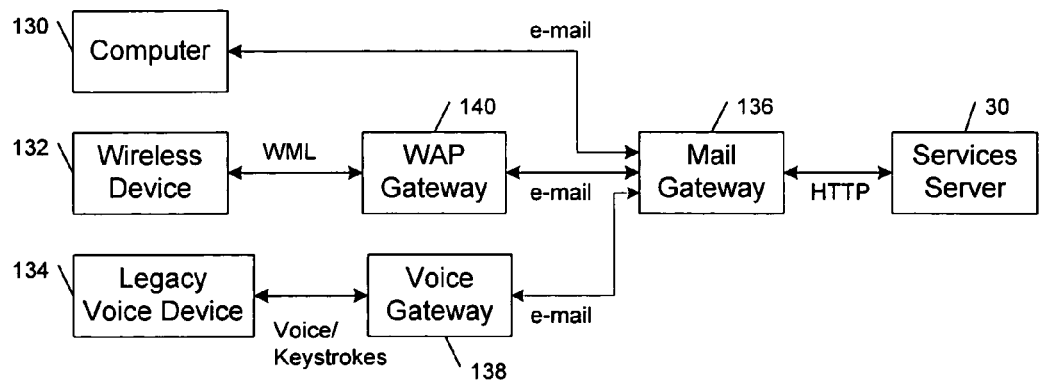
FIG. 8 is a block diagram of a computer, a wireless device and a legacy voice device communicating with a services server over a plurality of different transport facilities.

Referring to FIG. 8, a variety of different devices, including a computer 130, a wireless device 132 and a legacy voice device 134, may access one or more services provided by services server 30 over a network connection through a mail gateway 136. Mail gateway 136 may be implemented, for example, as a Microsoft Exchange server or an OpenMail server.

Legacy voice device 134 may connect to mail gateway 136 through a voice gateway 138. Voice gateway 138 provides basic speech-to-text and text-to-speech functions for enabling communications between legacy voice device 134 and mail gateway 136. Voice gateway 138 communicates with mail gateway 136 using a standard e-mail communication protocol (e.g., MAPI, X.400 or HTTP). Voice gateway 138 may present a request form containing one or more e-mail service options to legacy voice device 134 as a voice-based option tree. Voice gateway 138 translates the signals received from legacy voice device 134 into an e-mail message, and transmits the e-mail message to mail gateway 136. In one embodiment, the receipt of the e-mail message triggers a CDO script that invokes a COM object, which handles the completed VoxML request form and creates a server object that transmits an HTTP request-for-service call to services server 30, which processes the request-for-service call as described above. In another embodiment, mail gateway 136 may be configured to monitor one or more specified mailboxes, and to respond to messages delivered to the specified mailboxes.

Wireless device 132 may connect to mail gateway 136 through a WAP gateway 140. WAP gateway 140 enables communications between wireless device 132 and mail gateway 136. WAP gateway 140 communicates with mail gateway 136 using a standard e-mail communication protocol (e.g., MAPI, X.400 or HTTP). WAP gateway 140 may present a WML request form containing one or more e-mail service options to wireless device 132. WAP gateway 140 translates the response signals received from wireless device 132 into an e-mail message, and transmits the e-mail message to mail gateway 136. Mail gateway 136 may process the e-mail message received from WAP gateway 140 in one or more of the ways described in connection with legacy voice device 134.

Computer 130 may communicate directly with mail gateway 136 using a standard e-mail communication protocol (e.g., MAPI, X.400 or HTTP). Computer 130 may be presented with one or more service options as a Microsoft® Outlook® form, in which the message class can determine the type of data in the form and identify the service object that is needed to handle the message. The one or more service options alternatively may be presented as formatted or tagged text in the e-mail message body or subject line, or both, that performs the same functionality as a Microsoft® Outlook® form. Mail gateway 136 may process the e-mail message received from computer 130 in one or more of the ways described in connection with legacy voice device 134.

The systems and methods described herein are not limited to any particular hardware or software configuration, but rather they may be implemented in any computing or processing environment. Universal communication module preferably is implemented in a high level procedural or object oriented programming language; however, the program may be implemented in assembly or machine language, if desired. In any case, the programming language may be a compiled or interpreted language. In one embodiment, universal communication module 20 is implemented as a library of COM (Component Object Model) objects that may access one or more CDOs (Collaboration Data Objects) that are provided by the standard COM library, which is part of the operating system for Win32 platforms and is available as a separate package for other operating systems.

Universal communication module may be implemented in other programming paradigms, if desired. For example, although the above embodiments have been described in connection with the Microsoft NT server operating system, the embodiments easily may be programmed to operate in another computing environment, such as a Unix-based (e.g., Linux) computing environment utilizing JavaServer Page access file technology.

Other embodiments are within the scope of the claims.

What is claimed is:

1. A system for providing remote electronic services, comprising an agent, an access file, and a communication module, wherein:

the agent receives request-for-service calls in any format selected from a voice format, an internet format, an e-mail format, and a wireless format, each request-for-service call incorporating one or more control parameters including a destination node address, the agent transmits a request-for-service call to the access file in accordance with a hypertext transfer protocol for each of the received request-for-service calls;

the access file invokes at least one service module in response to a given request-for-service call received from the agent, the at least one service module performs a prescribed function to produce a service deliverable requested in the given request-for-service call, accesses an instance of the communication module, and passes the one or more control parameters and the service deliverable to the communication module in accordance with a hypertext transfer protocol; and the communication module transmits the service deliverable received from the at least one service module to the destination network node specified in the given request-for-service call in any format selected from a voice format, an internet format, an e-mail format, and a wireless format.

2. The system of claim 1, further comprising an origination agent configured to transmit a request-for-service call to the agent receiving request-for-service calls.

3. The system of claim 2, wherein the origination agent is configured to transmit the request-for-service call in accordance with a hypertext transfer protocol.

4. The system of claim 1, wherein the access file is an active server page.

5. The system of claim 1, wherein the access file is configured to obtain one or more control parameters from the given request-for-service call and to pass the control parameters to the at least one service module.

6. The system of claim 5, wherein the at least one service module is configured to pass the control parameters to the communication module as a function call to a COM (Component Object Model) interface.

7. The system of claim 1, wherein the communication module is configured to communicate with the destination network node over any one of the following transport facilities: a voice network, the Internet, an electronic mail (e-mail) network, and a wireless network.

8. The system of claim 1, wherein the communication module is configured to establish a communication link with the destination network node based upon the destination node address.

9. The system of claim 1, wherein the communication module is configured to format the service deliverable produced by the service module in accordance with an identified node type classification for the destination network node.

10. The system of claim 9, wherein the communication module is configured to identify a node type classification for the destination network node based upon a communication received from the destination network node.

11. The system of claim 9, wherein the communication module transmits the formatted service deliverable to the destination network node.

12. The system of claim 1, further comprising a destination agent residing at the destination network node and configured to communicate with the communication module.

13. The system of claim 1, wherein the at least one service module resides on a first server computer, and further comprising a second service module residing on a second server computer and configured to access a second instance of the communication module.

14. The system of claim 12, wherein the at least one service module and the second service module are configured to cooperatively perform respective functions to produce the service deliverable and to communicate through respective instances of the communication module.

15. The system of claim 14, wherein the instances of the communication module are configured to communicate with each other in accordance with a hypertext transfer protocol.

16. The system of claim 13, wherein each service module is registered in a common configuration database.

17. The system of claim 1, wherein the at least one service module is configured to produce an available services list to be presented by the communication module to a device initiating the given request-for-service call and residing at an origination network node.

18. The system of claim 17, wherein the communication module is configured to format the available services list in accordance with a received device type classification for the device at the origination network node.

19. The system of claim 1, wherein the communication module is configured to transmit a request for one or more control parameters to a device initiating the given request-for-service call and residing at an origination network node.

20. The system of claim 2, wherein the origination agent is configured to transmit one or more of the following control parameters with the request-for-service call: an origination address, a security profile identifier, a service identifier, an output type identifier, a destination device address, and data.

21. The system of claim 1, wherein the agent is operable to receive a voice request-for-service call in a voice format, convert the voice request-for-service call into a hypertext transfer protocol request-for-service call, and transmit the hypertext transfer protocol request-for-service call to the access file.

22. The system of claim 21, wherein the agent is operable to receive the voice request-for-service call in a VoxML format.

23. The system of claim 21, wherein the agent is operable to transmit a VoxML service request form in response to receipt of the request for service call.

24. The system of claim 1, wherein the agent is operable to receive an e-mail request-for-service call in an e-mail format, convert the e-mail request-for-service call into a hypertext transfer protocol request-for-service call, and transmit the hypertext transfer protocol request-for-service call to the access file.

25. The system of claim 1, wherein the agent is operable to receive a wireless request-for-service call in a wireless format, convert the wireless request-for-service call into a hypertext transfer protocol request-for-service call, and transmit the hypertext transfer protocol request-for-service call to the access file.

26. The system of claim 25, wherein the agent is operable to receive the wireless request-for-service call in a WML format.

27. The system of claim 25, wherein the agent is operable to transmit a WML service request form in response to receipt of the request for service call.

* * * * *